US008200675B2

(12) United States Patent
Kurian et al.

(10) Patent No.: US 8,200,675 B2
(45) Date of Patent: *Jun. 12, 2012

(54) VIRTUAL READER FOR SCORING APPLICATIONS

(75) Inventors: Marita Kurian, Austin, TX (US); Adam Miller, Pflugerville, TX (US); Oscar Sweeten-Lopez, Austin, TX (US); Kevin Byrne, Austin, TX (US)

(73) Assignee: Michael & Susan Dell Foundation, Austin, TX (US)

( * ) Notice: Subject to any disclaimer, the term of this patent is extended or adjusted under 35 U.S.C. 154(b) by 209 days.

This patent is subject to a terminal disclaimer.

(21) Appl. No.: 12/720,791

(22) Filed: Mar. 10, 2010

(65) Prior Publication Data

US 2011/0225169 A1 Sep. 15, 2011

(51) Int. Cl.
*G07F 17/30* (2006.01)

(52) U.S. Cl. ......... 707/748; 434/322; 235/375; 705/1.1

(58) Field of Classification Search ........... 707/999.003, 707/736; 235/375; 705/1.1; 434/322
See application file for complete search history.

(56) References Cited

U.S. PATENT DOCUMENTS

| 5,718,591 | A | * | 2/1998 | Clark et al. | 434/322 |
|---|---|---|---|---|---|
| 7,792,685 | B2 | * | 9/2010 | Andino et al. | 705/1.1 |
| 2007/0218450 | A1 | * | 9/2007 | MacClay et al. | 434/353 |
| 2008/0052103 | A1 | * | 2/2008 | Andino et al. | 705/1 |
| 2008/0311551 | A1 | * | 12/2008 | Reed | 434/356 |
| 2009/0011396 | A1 | * | 1/2009 | Gedlinske et al. | 434/322 |
| 2009/0119258 | A1 | * | 5/2009 | Petty | 707/3 |
| 2011/0220710 | A1 | * | 9/2011 | Kurian et al. | 235/375 |

* cited by examiner

*Primary Examiner* — Tony Mahmoudi
(74) *Attorney, Agent, or Firm* — Hamilton & Terrile, LLP; Stephen A. Terrile (57) ABSTRACT

A system, method, and computer-readable medium are disclosed for the automated processing and scoring of applications. Application reader resources are selected to read and score individual categories of the application. The difference between the respective reader scores and an average delta value for each category of each application that the selected readers have previously score is calculated. The standard deviation of the average delta value for each category is calculated. If the selected reader's score for that category is not within one standard deviation of the average delta value, then the selected reader's score is adjusted the least amount necessary to be so.

14 Claims, 5 Drawing Sheets

VIRTUAL READER FOR SCORING APPLICATIONS

BACKGROUND OF THE INVENTION

1. Field of the Invention

Embodiments of the invention relate generally to information handling systems. More specifically, embodiments of the invention provide a system, method, and computer-readable medium for the automatic processing and scoring of applications.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, it has become popular for charitable organizations to use such information handling systems to assist in the automation of their day-to-day operations. As an example, information handling systems are commonly used for accounting, project management, document preparation, and presentations. In particular, the use of information handling systems is particularly advantageous for the processing of applications for charitable aid, such as grants and scholarships.

Many of these charitable organizations face challenges on multiple fronts, including an increased volume of applications that need to be processed. The processing of these applications can be automated to a degree. However, certain parts can not, and must be read by one or more human resources. In particular, the application typically needs to be scored such that the most deserving application receives the requested funding.

However, the availability of human resources for manually processing, reading, and scoring such applications may be limited. Furthermore, the assignment of the most appropriate readers to a given application may present challenges if they are already committed to another application. Moreover, one reader may provide a score that is significantly different than the scores provided by other readers, all of which may be equally qualified. As a result, lack of automated reader assignment and application scoring resolution can cause delays, confusion, and disagreement when deciding which applicant deserves to receive funding at the expense of another.

SUMMARY OF THE INVENTION

A system, method, and computer-readable medium are disclosed for the automated processing and scoring of applications. In various embodiments, applications are received and then automatically processed to determine whether individual applications meet predetermined criteria for assignment to available application reader resources for further processing and scoring. If so, then an application is selected and then assigned to a first and second application reader resource to read and score individual categories of the application.

In various embodiments, a delta value is calculated for the difference between the respective reader scores for each category of the selected application. An average delta value is then calculated for each category of each application that the selected readers have previously scored. An application category is then selected and the standard deviation of the average delta value for that category is calculated for the selected readers. If the selected reader's score for that category is not within one standard deviation of the previously calculated average delta value, then the selected reader's score is adjusted the least amount necessary to be so. Thereafter, or if the selected reader's score for that category is within one standard deviation of the previously calculated average delta value, then the same set of calculations are performed for all categories of the application.

The total adjusted score for the application, for each respective reader, is then calculated. If the adjusted reader score delta is not within predetermined limits, then an additional application reader is selected to read the application and generate another score for the application. The final score for the selected application is calculated. If at least two reader scores are not within one standard deviation of the previously calculated average adjusted scores, then an additional application reader is selected to read and score the application. Once all applications have been processed and scored, final scoring of all applications is performed and the scored applications are ranked in descending order according to their final scores. Which applicants will receive an award, and which will not, is determined and each applicant is then notified of the results of the awards determination. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for the automated processing and scoring of applications. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
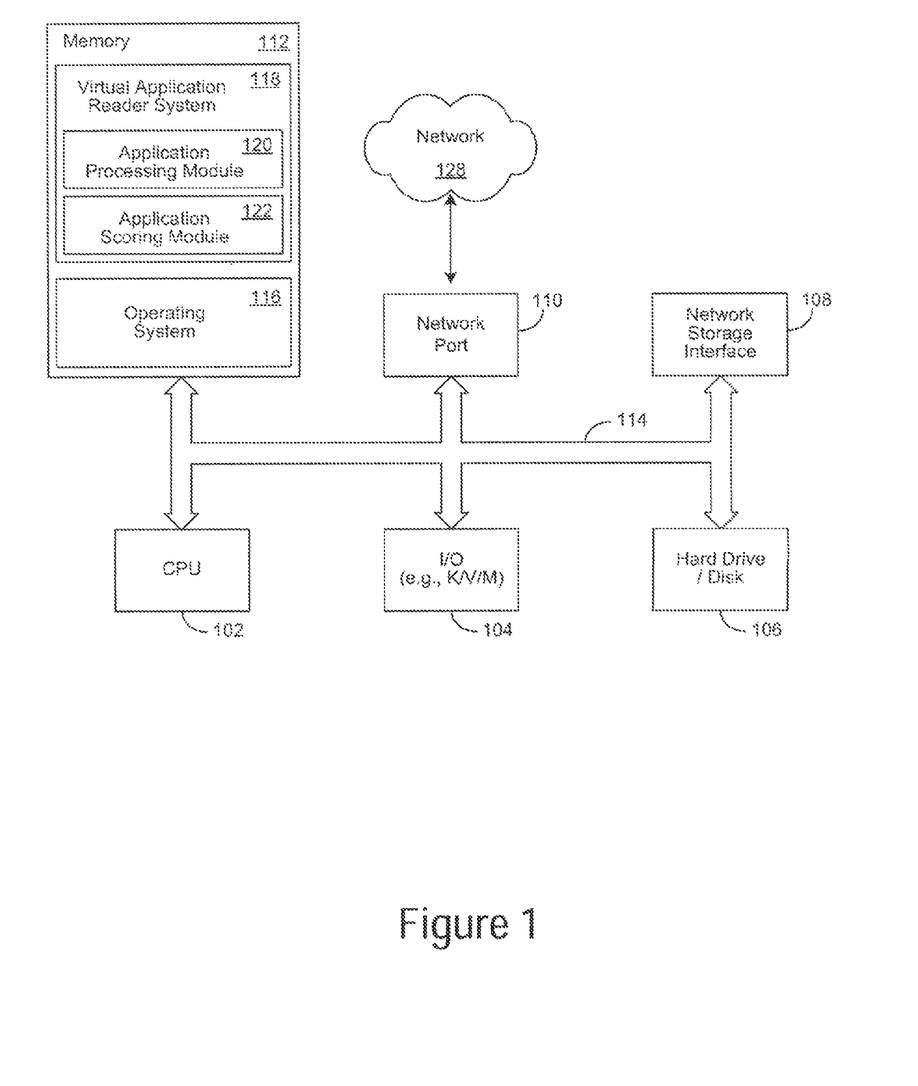
FIG. 1 is a generalized illustration of an information handling system that is used to implement the system and method of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110 operable to connect to a network 128 to provide user access to the endowment site web pages 140, and system memory 112, all interconnected via one or more buses 114. System memory 112 further comprises an operating system 116 and a virtual application reader control system 118, which in turn comprises an application processing module 120 and an application scoring module 122.

Figure 2:
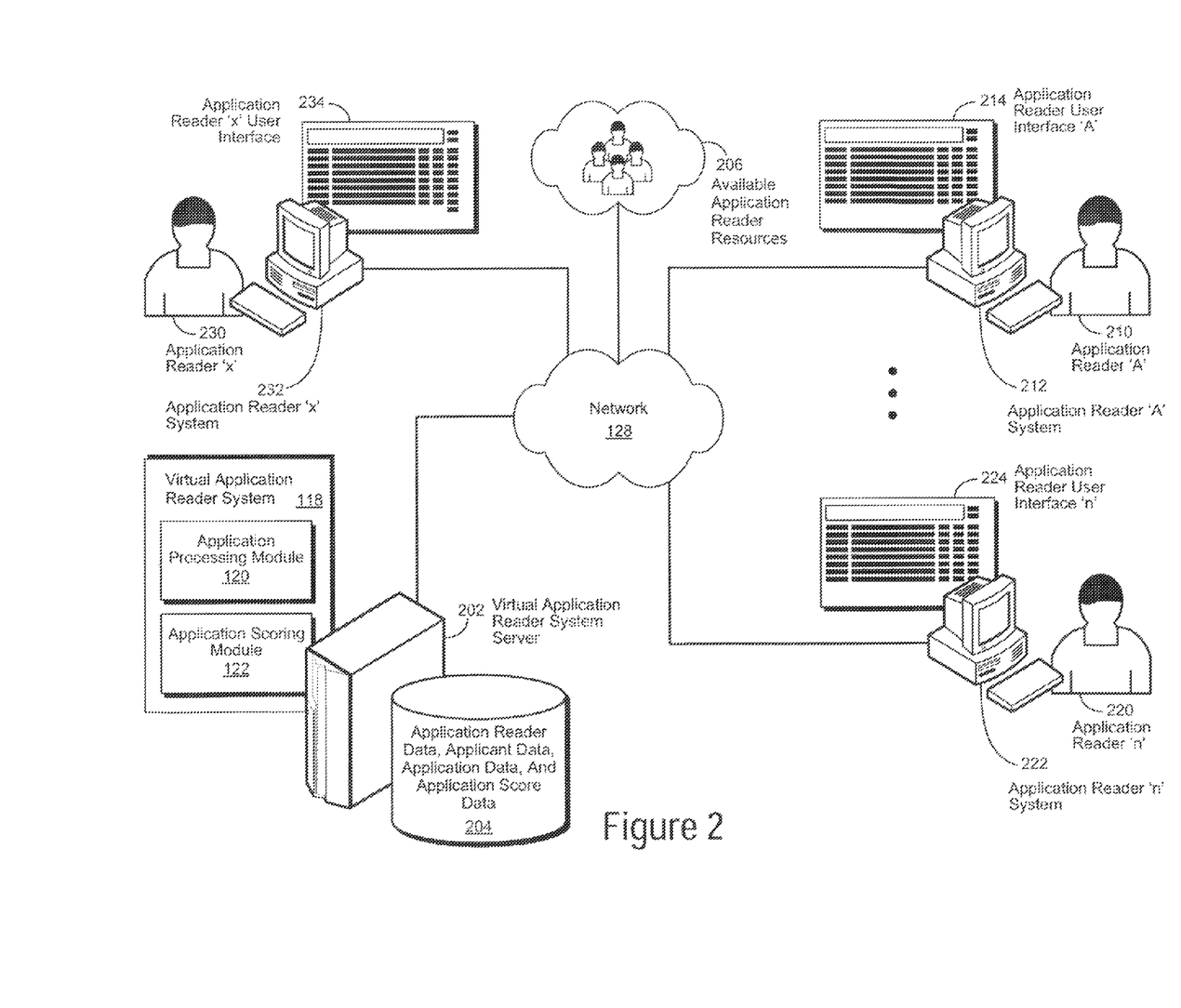
FIG. 2 is a simplified block diagram of the operation of a virtual application reader system.

FIG. 2 is a simplified block diagram of the operation of a virtual application reader system as implemented in accordance with an embodiment of the invention. In various embodiments, a virtual application reader system 118 is implemented for the automated processing and scoring of applications. In these and other embodiments, the virtual application reader system 118 comprises an application processing module 120 and an application scoring module 122. In various embodiments, the virtual application reader system 118 may be implemented on a virtual application reader system server 202 and access a repository 204 of application reader data, applicant data, application data, and application score data.

In these and other embodiments, the virtual application reader system 118 first determines available application reader resources. As used herein, application reader resources refer to human readers that are able to read an application and assign a score to predetermined portions of the application. As likewise used herein, an application refers to a formalized request for monetary funds, goods, services, or any other tangible or intangible measure of value. In various embodiments, the application may be submitted by an applicant in a physical (e.g., written) or electronic (e.g., on-line or digitized) form. In various other embodiments, the application may be submitted verbally and transcribed into a physical or electronic form.

Applications are then received for processing by the virtual application reader system 118, which in turn selects an application for processing. Preliminary automated processing of the application is then performed. As an example, the application may be submitted on-line to the virtual application reader system 118 over a connection to network 128 and then processed to ensure that all required fields have been populated. Skilled practitioners of the art will be aware that many such examples are possible and the foregoing is not intended to limit the spirit, scope, or intent of the invention. In various embodiments, the application processing module 120 may receive, select, and perform the preliminary, or initial, processing of the application.

A determination is then made whether the application conforms to predetermined threshold values. As an example, a numeric value entered into a field of the application may be compared against predetermined numeric value. To further the example, the numeric value entered may be an application submission date and the predetermined threshold value may be a submission deadline date. Accordingly, the application would fail to conform to the predetermined threshold value if the application submission date was past the submission deadline date.

If so, then a first (e.g., application reader 'A' 210) application reader resource and a second (e.g., application reader 'n' 220) application reader resource is then selected from the available application reader resources 206 to read and score the application. Thereafter, the application is provided to the application readers 'A' 210 and 'n' 220 for reading and scoring. In various embodiments, the application is respectively displayed on the application reader user interface (UI) 'A' 214 and 'n' 224 respectively implemented on the application reader application reader system 'A' 212 and 'n' 222.

The selected application readers 'A' 210 and 'n' 220 then read and generate scores for each category of the application. In various embodiments, an application may comprise a plurality of category and sub-category sections. In these and other embodiments, the selected readers generate a score for each category and sub-category section. As an example, an application for a scholarship may comprise 'Academic', 'Employment', 'Responsibility', and 'Disadvantage' categories, each of which may comprise further subcategories.

In various embodiments, a delta value is calculated for the difference between the respective reader scores for each category of the selected application. An average delta value is then calculated for each category of each application that the selected readers have previously scored. An application category is then selected and the standard deviation of the average delta value for that category is calculated for the selected readers. If the selected reader's score for that category is not within one standard deviation of the previously calculated average delta value, then the selected reader's score is adjusted the least amount necessary to be so.

Thereafter, or if the selected reader's score for that category is within one standard deviation of the previously calculated average delta value, then the same set of calculations are performed for all categories of the application. The total adjusted score for the application, for each respective reader, is then calculated. If the adjusted reader score delta is not within predetermined limits, then an additional application reader 'x' 230 is selected to read the application and generate another score for the application as described in greater detail herein. In various embodiments, the application is displayed on the application reader 'x' UI 234 implemented on the application reader 'x' system 232.

Thereafter, the average adjusted scores of all applications previously read and scored by all readers is calculated, along with a corresponding standard deviation. If the total score of the selected application is not within one standard deviation of the previously calculated average adjusted scores, then the reader score for the selected application that is furthest from the previously calculated average adjusted scores is excluded and the scoring process is continued. Otherwise, the final score for the selected application is calculated. If at least two reader scores are not within one standard deviation of the previously calculated average adjusted scores, then an additional application reader 'x' 230 is selected to read and score the application. The scoring process is then continued as described in greater detail herein.

Once all applications have been processed and scored, final scoring of all applications is performed and the scored applications are ranked in descending order according to their final scores. Which applicants will receive an award, and which will not, is determined and each applicant is then notified of the results of the awards determination.

Figure 3A:
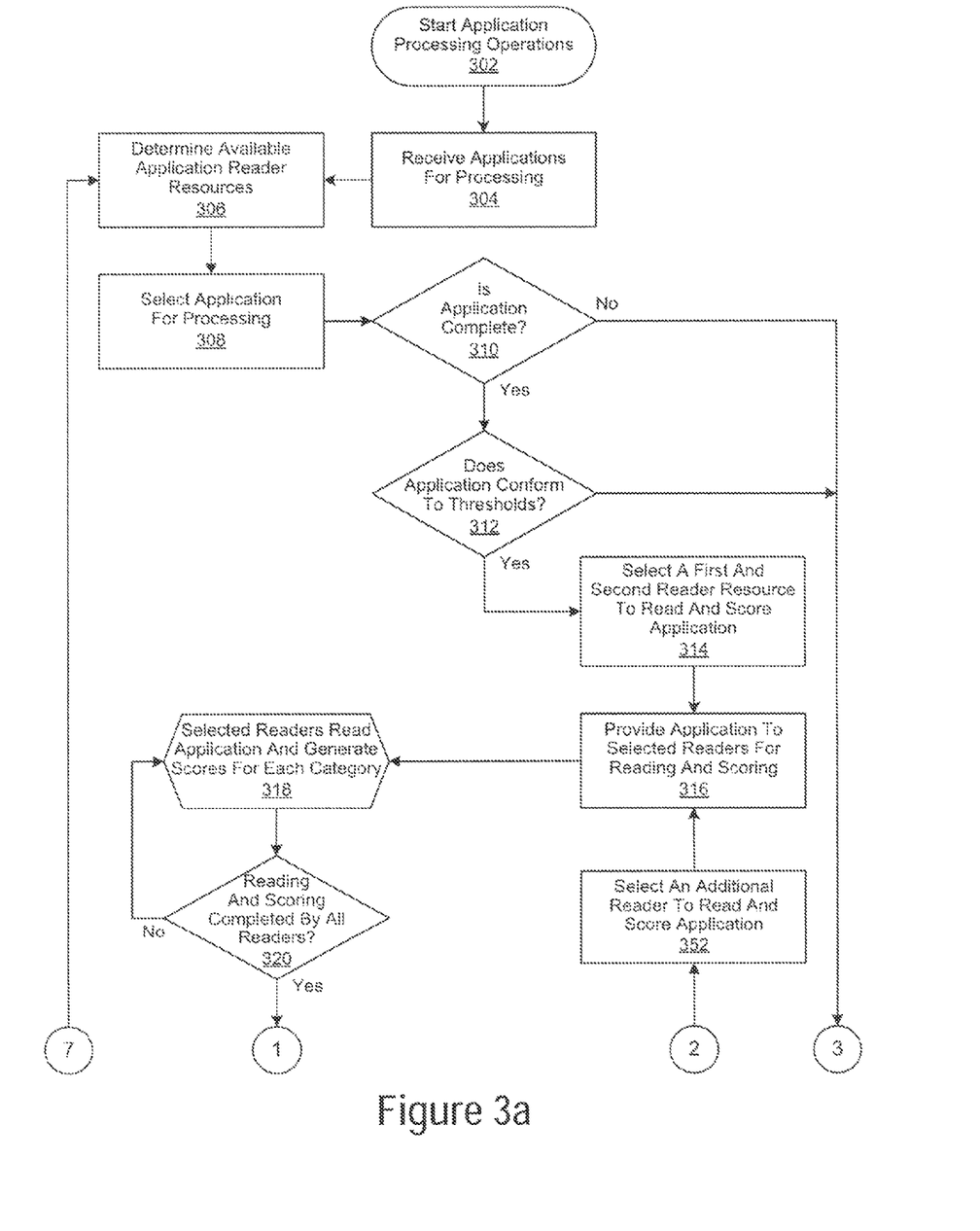
FIGS. 3a-c are a generalized flow chart of the performance of automated application processing and scoring operations.
Figure 3B:
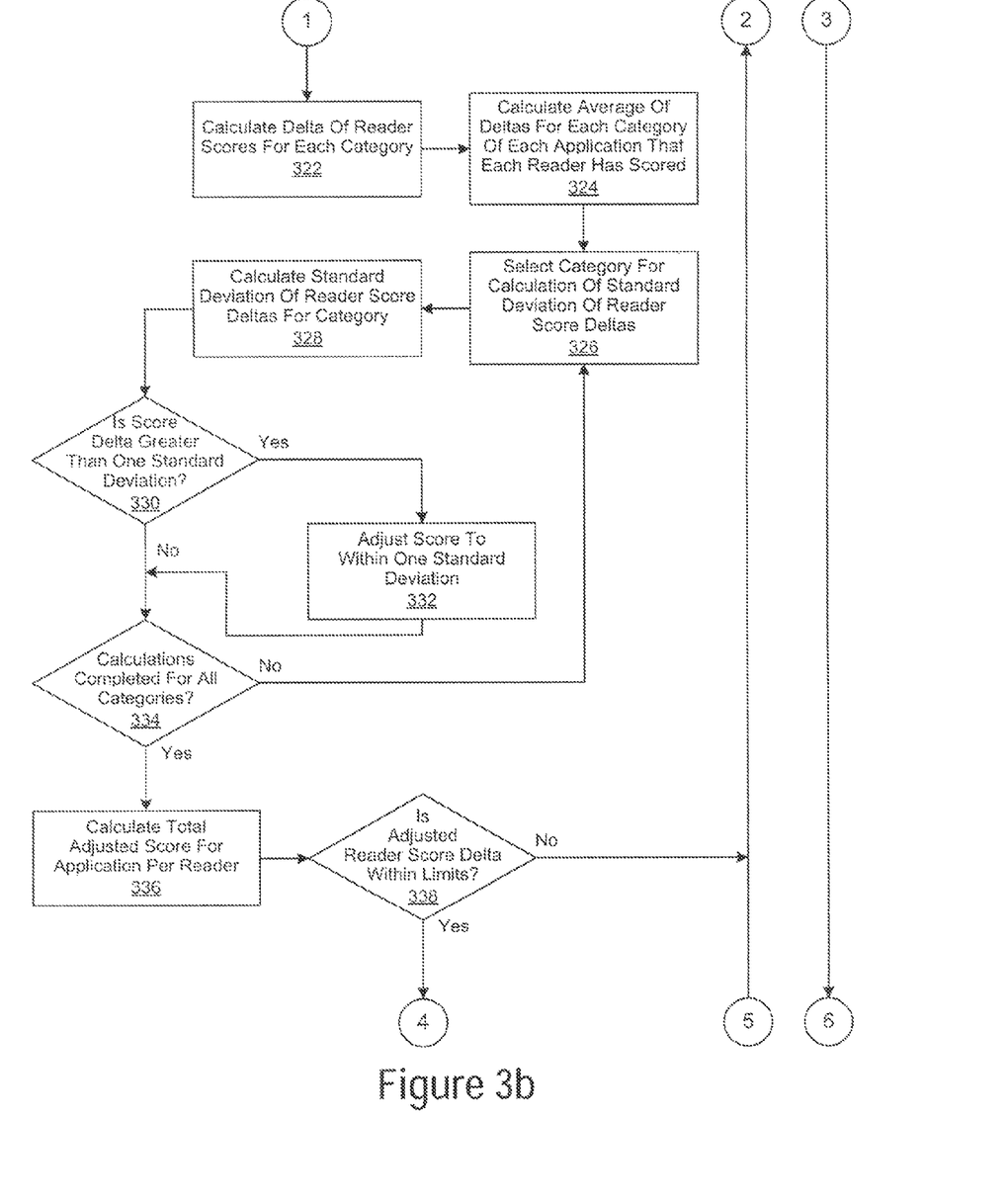
Figure 3C:
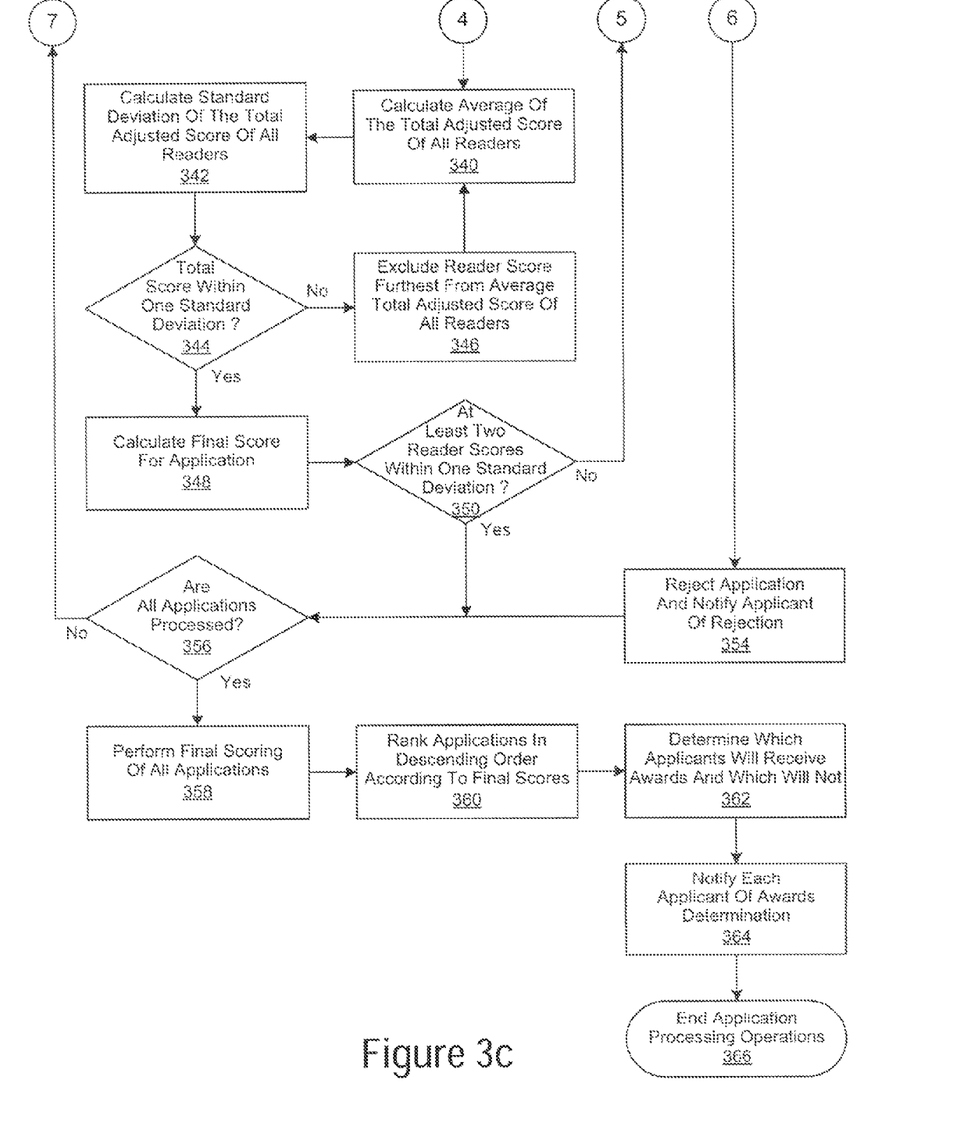

FIGS. 3a-c are a generalized flow chart of the performance of automated application processing and scoring operations. In this embodiment, automated application processing and scoring operations are started in step 302, followed by the virtual application reader system receiving applications for processing in step 304. Available application reader resources are determined in step 306, followed by the selection of an application for processing in step 308.

A determination is then made in step 310 whether the application is complete (e.g., all fields in the application have been populated). If so, then a determination is made in step 312 whether the application conforms to predetermined threshold values. If so, then a first and second reader resource is selected from the available reader resources in step 314 to read and score the selected application. The application is then provided to the selected readers for reading and scoring in step 334, who then read and generate scores for each category of the application in step 318. A determination is then made in step 320 whether the reading and associated scoring of the application by the selected readers are completed. If not, then the process is continued, proceeding with step 318.

Otherwise, a delta value is calculated in step 322 for the difference between the respective reader scores for each category of the selected application. Then, in step 324, the average delta value is calculated for each category of each application that the selected readers have previously scored. An application category is then selected in step 326 to calculate the standard deviation of the average delta value for that category for the selected readers. The standard deviation is then calculated in step 328, followed by a determination being made in step 330 whether the selected reader's score for that category is within one standard deviation of the previously calculated average delta value. If not, then the selected reader's score is adjusted the least amount necessary in step 332 for the reader's score for the selected category to be within one standard deviation of the previously calculated average delta value.

Thereafter, or if it is determined in step 330 that the selected reader's score for that category is within one standard deviation of the previously calculated average delta value, then a determination is made in step 334 whether all calculations have been completed for all categories of the application. If not, the process is continued, proceeding with step 326. Otherwise, the total adjusted score for the application, for each respective reader, is calculated in step 336. A determination is then made in step 338 whether the adjusted reader score delta is within predetermined limits. In various embodiments, the predetermined limits are configured by a system administrator. If it is determined in step 338 that the adjusted reader score delta is not within predetermined limits, then an additional reader is selected in step 352 to read and score the application and the process is continued, proceeding with step 316.

However, if it is determined in step 338 that the adjusted reader score delta is within predetermined limits, then the average adjusted scores of all applications previously read and scored by all readers is calculated in step 340. The standard deviation of the previously calculated average adjusted scores is then calculated in step 342. A determination is then made in step 344 whether the total score of the selected application is within one standard deviation of the previously calculated average adjusted scores. If not, then the reader score for the selected application that is furthest from the previously calculated average adjusted scores is excluded and the process is continued, proceeding with step 340.

Otherwise, the final score for the selected application is calculated in step 348, followed by a determination being made in step 350 whether at least two reader scores are within one standard deviation of the previously calculated average adjusted scores. If not, then an additional reader is selected in step 352 to read and score the application and the process is continued, proceeding with step 316. Otherwise, or if the selected application has been rejected in step 354, then a determination is made in step 356 whether all applications have been processed. If not, then the process is continued, proceeding with step 306. Otherwise, final scoring of all applications is performed in step 358 and the scored applications are ranked in step 360 in descending order according to their final scores. Which applicants will receive an award, and which will not, is then determined in step 362. Each applicant is then notified of the results of the awards determination in step 364 and automated application processing and scoring operations are ended in step 366.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implemented method for the automated scoring of an application, comprising a processor operable to execute processing logic used for:
   receiving an application for scoring, wherein said application comprises application data associated with an applicant;
   selecting a first reader resource and a second reader resource from a plurality of reader resources, wherein said application is assigned to said first and second reader resources;
   receiving input data from said first and second reader resources, said input data comprising first reader resource score data and second reader resource score data and
   generating a score variance between said first and second reader resources;
   processing score variance values respectively associated with applications previously scored by said first reader resource and said second reader resource to generate first and second average score variance values corresponding to said first and second reader resources;
   processing said first and second average score variance values to generate corresponding first and second standard deviation values;
   adjusting said first reader resource score data and said second reader resource score data to respectively generate first and second adjusted score variance values within said first and second standard deviation values; and
   processing said first reader resource score data, second reader resource score data, and said first and second adjusted score variance values to generate a first adjusted score for said application;
   selecting a third reader resource from said plurality of reader resources if said first and second adjusted score variance values exceed a predetermined variance limit value;
   receiving input data from said third reader resource, said input data comprising third reader resource score data;
   processing score variance values respectively associated with applications previously scored by said third reader resource to generate a third average score variance values corresponding to said third reader resource;
   processing said third average score variance values to generate a corresponding third standard deviation value;
   processing said first, second, and third reader resource score data, and said first, second, and third adjusted score variance values to generate a second adjusted score for said application.

2. The method of claim 1, further comprising:
   processing said first, second, and third adjusted scores to generate a first final score for said application.

3. The method of claim 2, further comprising:
   processing adjusted scores respectively associated with applications previously scored by said first, second, and third reader resources to respectively generate first, second, and third average adjusted scores corresponding to said first, second, and third reader resources;
   processing said first, second, and third average adjusted scores to generate corresponding fourth, fifth, and sixth standard deviation values; and
   processing said first final score, said first, second, and third average adjusted scores, and said fourth, fifth, and sixth standard deviation values to determine whether said final score is within said fourth, fifth, and sixth standard deviation values.

4. The method of claim 3, further comprising:
   discarding said first, second, and third adjusted scores that are not within said fourth, fifth, and sixth standard deviation values; and
   processing remaining said first, second, and third adjusted scores to generate a second final score for said application.

5. A system comprising:
   a processor;
   a data bus coupled to the processor; and
   a computer-usable medium embodying computer program code, the computer-usable medium being coupled to the data bus, the computer program code interacting with a plurality of computer operations and comprising instructions executable by the processor and configured for:
      receiving an application for scoring, wherein said application comprises application data associated with an applicant;
      selecting a first reader resource and a second reader resource from a plurality of reader resources, wherein said application is assigned to said first and second reader resources;
      receiving input data from said first and second reader resources, said input data comprising first reader resource score data and second reader resource score data; and
      generating a score variance between said first and second reader resources;
   processing score variance values respectively associated with applications previously scored by said first reader resource and said second reader resource to generate first and second average score variance values corresponding to said first and second reader resources;
   processing said first and second average score variance values to generate corresponding first and second standard deviation values;
   adjusting said first reader resource score data and said second reader resource score data to respectively generate first and second adjusted score variance values within said first and second standard deviation values; and
   processing said first reader resource score data, second reader resource score data, and said first and second adjusted score variance values to generate a first adjusted score for said application;
   selecting a third reader resource from said plurality of reader resources if said first and second adjusted score variance values exceed a predetermined variance limit value;
   receiving input data from said third reader resource, said input data comprising third reader resource score data;
   processing score variance values respectively associated with applications previously scored by said third reader resource to generate a third average score variance values corresponding to said third reader resource;
   processing said third average score variance values to generate a corresponding third standard deviation value; and
   processing said first, second, and third reader resource score data, and said first, second, and third adjusted score variance values to generate a second adjusted score for said application.

6. The system of claim 5, further comprising:
   processing said first, second, and third adjusted scores to generate a first final score for said application.

7. The system of claim 6, further comprising:
- processing adjusted scores respectively associated with applications previously scored by said first, second, and third reader resources to respectively generate first, second, and third average adjusted scores corresponding to said first, second, and third reader resources;
- processing said first, second, and third average adjusted scores to generate corresponding fourth, fifth, and sixth standard deviation values; and
- processing said first final score, said first, second, and third average adjusted scores, and said fourth, fifth, and sixth standard deviation values to determine whether said final score is within said fourth, fifth, and sixth standard deviation values.

8. The system of claim 7, further comprising:
- discarding said first, second, and third adjusted scores that are not within said fourth, fifth, and sixth standard deviation values; and
- processing remaining said first, second, and third adjusted scores to generate a second final score for said application.

9. A non-transitory computer-readable medium embodying computer program code, the computer program code comprising computer executable instructions configured for:
- receiving an application for scoring, wherein said application comprises application data associated with an applicant;
- selecting a first reader resource and a second reader resource from a plurality of reader resources, wherein said application is assigned to said first and second reader resources;
- receiving input data from said first and second reader resources, said input data comprising first reader resource score data and second reader resource score data; and
- generating a score variance between said first and second reader resources;
- processing score variance values respectively associated with applications previously scored by said first reader resource and said second reader resource to generate first and second average score variance values corresponding to said first and second reader resources;
- processing said first and second average score variance values to generate corresponding first and second standard deviation values;
- adjusting said first reader resource score data and said second reader resource score data to respectively generate first and second adjusted score variance values within said first and second standard deviation values; and
- processing said first reader resource score data, second reader resource score data, and said first and second adjusted score variance values to generate a first adjusted score for said application;
- selecting a third reader resource from said plurality of reader resources if said first and second adjusted score variance values exceed a predetermined variance limit value;
- receiving input data from said third reader resource, said input data comprising third reader resource score data;
- processing score variance values respectively associated with applications previously scored by said third reader resource to generate a third average score variance values corresponding to said third reader resource;
- processing said third average score variance values to generate a corresponding third standard deviation value; and
- processing said first, second, and third reader resource score data, and said first, second, and third adjusted score variance values to generate a second adjusted score for said application.

10. The computer readable medium of claim 9, further comprising:
- processing said first, second, and third adjusted scores to generate a first final score for said application.

11. The computer readable medium of claim 10, further comprising:
- processing adjusted scores respectively associated with applications previously scored by said first, second, and third reader resources to respectively generate first, second, and third average adjusted scores corresponding to said first, second, and third reader resources;
- processing said first, second, and third average adjusted scores to generate corresponding fourth, fifth, and sixth standard deviation values; and
- processing said first final score, said first, second, and third average adjusted scores, and said fourth, fifth, and sixth standard deviation values to determine whether said final score is within said fourth, fifth, and sixth standard deviation values.

12. The computer readable medium of claim 11, further comprising:
- discarding said first, second, and third adjusted scores that are not within said fourth, fifth, and sixth standard deviation values; and
- processing remaining said first, second, and third adjusted scores to generate a second final score for said application.

13. The computer readable medium of claim 9, wherein the computer executable instructions are deployable to a client computer from a server at a remote location.

14. The computer readable medium of claim 9, wherein the computer executable instructions are provided by a service provider to a customer on an on-demand basis.

* * * * *